United States Patent
Sakai

(10) Patent No.: US 7,952,742 B2
(45) Date of Patent: May 31, 2011

(54) INFORMATION PROCESSING APPARATUS FOR PROCESSING PRINT DATA, METHOD THEREOF AND MEDIA IN STORAGE OF CONTROL PROGRAM OF EXECUTING SUCH METHOD

(75) Inventor: Katsuya Sakai, Akiruno (JP)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 11/813,586

(22) PCT Filed: Feb. 17, 2006

(86) PCT No.: PCT/JP2006/303349
§ 371 (c)(1),
(2), (4) Date: Jul. 9, 2007

(87) PCT Pub. No.: WO2006/088242
PCT Pub. Date: Aug. 24, 2006

(65) Prior Publication Data
US 2009/0033975 A1 Feb. 5, 2009

(30) Foreign Application Priority Data

Feb. 18, 2005 (JP) ................. 2005-043100

(51) Int. Cl.
*G06F 15/00* (2006.01)
*G06F 21/00* (2006.01)
(52) U.S. Cl. .................. 358/1.15; 713/186
(58) Field of Classification Search .......... 358/1.15, 358/1.13, 1.14, 1.16, 1.18, 1.1, 3.27, 1.11; 382/297, 115, 112; 715/700; 713/186
See application file for complete search history.

(56) References Cited

U.S. PATENT DOCUMENTS
2004/0021905 A1 * 2/2004 Holmstead et al. ......... 358/1.16

FOREIGN PATENT DOCUMENTS
| JP | 8-267867 | 10/1996 |
| JP | 10-21416 | 1/1998 |
| JP | 2002-197101 | 7/2002 |
| JP | 2003-216601 | 7/2003 |
| JP | 2003-216601 A | 7/2003 |
| JP | 2003-248563 | 9/2003 |
| JP | 2004-144554 | 5/2004 |

OTHER PUBLICATIONS

International Search Report in PCT/JP2006/303349, Feb. 17, 2006.
European Search Report dated Feb. 19, 2010 in 06728549.4.

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A method in an information processing apparatus of transmitting print data to a printing apparatus that is caused to print is disclosed. The method includes a transmitting process of transmitting, to the printing apparatus, identification information for specifying print data; and an obtaining process of obtaining update information of print data, corresponding with the relevant identification information, being present inside the printing apparatus. And, the transmitting process transmits difference data between the print data corresponding with the update information that the obtaining process has obtained and print data that are intended to be transmitted.

19 Claims, 15 Drawing Sheets

FIG. 7

```
<?xml version="1.0">
<!DOCTYPE aaa PUBLIC "-//OWNER//DTD AAA 1.01//EN"
"http://aaa.bbb.ccc/DTD/aaa1_01.dtd">
<document>
<info>
<id>b555804569a545fd9adc7cc6fa150824</id>
<date year="2004" month="11"day="21"hour="1"minite="9"second="50" timezone="JST"/>
<auther>Suzuki Saburo</auther>
</info>
<docbody >
<svg width="600" height="600">
<g>
<defs>
<linearGradient id="Gradient1">
<stop offset="0%" style="stop-color:#ffff00"/>
<stop offset="100%" style="stop-color:#ff0000"/>
</linearGradient>
<linearGradient id="Gradient2">
<stop offset="0%" style="stop-color:#00ff00"/>
<stop offset="100%" style="stop-color:#ff00ff"/>
</linearGradient>
<linearGradient id="Gradient3">
<stop offset="0%" style="stop-color:#00ffff"/>
<stop offset="100%" style="stop-color:#ffff00"/>
</linearGradient>
</defs>
<text style="fill:#b3b3b3;font-size:55pt" x="0" y="60"> Sample1 </text>
<text style="fill:url(#Gradient1);font-size:55pt" x="0" y="120"> Sample2 </text>
<text style="fill:url(#Gradient2);font-size:55pt" x="0" y="180"> Sample3 </text>
<text style="fill:url(#Gradient3);font-size:55pt" x="0" y="240"> Sample4 </text>
<text style="fill:#000000;font-size:55pt" x="0" y="300"> Sample0 </text>
</g>
</svg>
</docbody>
</document>
```

DOCUMENT IDENTIFICATION INFORMATION: lines from `<?xml...` through `</info>`

DOCUMENT BODY: lines from `<docbody >` through `</svg>`

FIG. 8

```
Sample1
Sample2
Sample3
Samplo4
Sample0
```

FIG. 9

```
<?xml version="1.0">
<!DOCTYPE aaa PUBLIC "-//OWNER//DTD AAA 1.01//EN"
"http://aaa.bbb.ccc/DTD/aaa1_01.dtd">
<document>
<info>
<id>b555804569a545fd9adc7cc6fa150824</id>
<date year="2004" month="11" day="21" hour="1" minite="9" second="50" timezone="JST"/>
<auther>Suzuki Saburo</auther>
</info>
<docbody >
<svg width="600" height="600">
<g>
<defs>
<linearGradient id="Gradient1">
<stop offset="0%" style="stop-color:#ffff00"/>
<stop offset="100%" style="stop-color:#ff0000"/>
</linearGradient>
<linearGradient id="Gradient2">
<stop offset="0%" style="stop-color:#00ff00"/>
<stop offset="100%" style="stop-color:#ff00ff"/>
</linearGradient>
<linearGradient id="Gradient3">
<stop offset="0%" style="stop-color:#00ffff"/>
<stop offset="100%" style="stop-color:#ffff00"/>
</linearGradient>
</defs>
<text style="fill:#b3b3b3;font-size:55pt" x="0" y="60"> Sample1 </text>
<text style="fill:url(#Gradient1);font-size:55pt" x="0" y="120"> Sample2 </text>
<text style="fill:url(#Gradient2);font-size:55pt" x="0" y="180"> Sample3 </text>
<text style="fill:url(#Gradient3);font-size:55pt" x="0" y="240"> Samplo4 </text>
<text style="fill:#000000;font-size:55pt" x="0" y="300"> Sample0 </text>
</g>
</svg>
</docbody>
<update>
<info>
<base>b555804569a545fd9adc7cc6fa150824</base>
<id>bed44937c1d54c3c8019f97defa194fe</id>
<date year="2005" month="12" day="31" hour="23" minite="59" second="59" timezone="JST"/>
<auther>Suzuki Jiro</auther>
</info>
<diff type="text" locate="a20 1">
<text style="fill:url(#Gradient3);font-size:55pt" x="0" y="240"> Sample4 </text>
</diff>
</update>
</document>
```

- DOCUMENT IDENTIFICATION INFORMATION
- DOCUMENT BODY
- UPDATE IDENTIFICATION INFORMATION
- UPDATE DATA

FIG. 10

```
Sample1
Sample2
Sample3
Sample4
Sample0
```

FIG. 11

```
<?xml version="1.0">
<!DOCTYPE aaa PUBLIC "-//OWNER//DTD  AAA 1.01//EN"
"http://aaa.bbb.ccc/DTD/aaa1_01.dtd">
<update>
<info>
<base>b555804569a545fd9adc7cc6fa150824</base>
<id>bed44937c1d54c3c8019f97defa194fe</id>
<date year="2005" month="12" day="31" hour="23" minite="59" second="59" timezone="JST"/>
<auther>Suzuki Jiro</auther>
</info>
<diff type="text" locate="a20 1">
<text style="fill:url(#Gradient3);font-size:55pt" x="0" y="240"> Sample4 </text>
</diff>
</update>
```

FIG. 12

```
<?xml version="1.0">
<!DOCTYPE aaa PUBLIC "-//OWNER//DTD AAA 1.01//EN"
"http://aaa.bbb.ccc/DTD/aaa1_01.dtd">
<update>
<info>
<base>b555804569a545fd9adc7cc6fa150824</base>
<id>bed44937c1d54c3c8019f97defa194fe</id>
<date year="2005" month="12" day="31" hour="23" minite="59" second="59" timezone="JST"/>
<auther>Suzuki Jiro</auther>
</info>
</update>
```

INFORMATION PROCESSING APPARATUS FOR PROCESSING PRINT DATA, METHOD THEREOF AND MEDIA IN STORAGE OF CONTROL PROGRAM OF EXECUTING SUCH METHOD

TECHNICAL FIELD

The present invention relates to a print system with a print client and a printing device brought into connection on a network, a print method and its program.

BACKGROUND ART

Conventionally, technologies of transmitting difference data to implement printing have been proposed as technologies of implementing rapid printing in a print system. For example, at the time of implementing printing from a host, a technology of checking whether print data are those transmitted onto a host in the past, preparing difference data if the data were transmitted in the past, transmitting difference data to a printing apparatus, retaining the entire print data in the host, and thereby realizing the time crunch until a print result is derived has been disclosed (for example, Japanese Patent Laid-Open No. H8-267867).

On the other hand, in document management technologies, a technology of correlating a history of updates with a document as update history information and making reference to that update history information, thereby restoring an electronic document before and after an update in the past is proposed (see, for example, Japanese Patent Laid-Open No. 2003-216601).

However, since the technology in Japanese Patent Laid-Open No. H8-267867 having been described above determines whether or not print data were stored onto a host computer and transmitted in the past, in the case where the same document undergoes print from another host computer, the entire print data will be retransmitted, giving rise to a problem that a time crunch of data transfer time at the time of printing cannot be realized. In addition, the technology in Japanese Patent Laid-Open No. 2003-216601 is a technology focusing on realization of reliable document assurance for data and on storage so as to enable restoration of electronic documents over a great number of generations, but has taken no print into consideration, thus giving rise to a problem that update information included in a document will never be put into practical use at the time of printing this document.

DISCLOSURE OF THE INVENTION

The present invention has been derived in consideration of the circumstances having been described above and an object of the present invention is to put update information of a document into practical use and to thereby provide a print system, a print method and a program thereof that will enable a time crunch of data transfer at the time of printing between a plurality of host computers (print clients) and/or document management apparatuses and a printing device.

According to one aspect of the present invention, an information processing apparatus for transmitting print data to a printing apparatus that is caused to print comprises a transmission unit for transmitting, to the printing apparatus, identification information for specifying print data and an obtaining unit for obtaining update information of print data being present inside the printing apparatus and corresponding with the identification information, and the transmission unit transmits, to the printing apparatus, difference data between the print data corresponding with the update information that the obtaining unit has obtained and print data that are intended to be transmitted.

Other features and advantageous of the present invention will be apparent from the following description taken in conjunction with the accompanying drawings, in which like reference characters designate the same or similar parts throughout there of.

BRIEF DESCRIPTION OF THE DRAWINGS

FIG. 7 is a drawing showing, in a print client 101, a configuration example of a document data (PDL format) when a novel document is created;

FIG. 8 is a drawing showing an output result based on document data in FIG. 7;

FIG. 9 is a drawing showing a configuration example of document data in the case where document data shown in FIG. 7 have undergone an update;

FIG. 10 is a drawing showing an output result based on document data in FIG. 9;

FIG. 11 is a drawing showing an example of difference data transmitted from a print client 101 to a printing device 102;

FIG. 12 is a drawing showing an example of version information transmitted from a print client 101 to a printing device 102;

BEST MODE FOR CARRYING OUT THE INVENTION

Embodiments of the present invention will be described below in detail with reference to drawings.

First Embodiment

Figure 1:
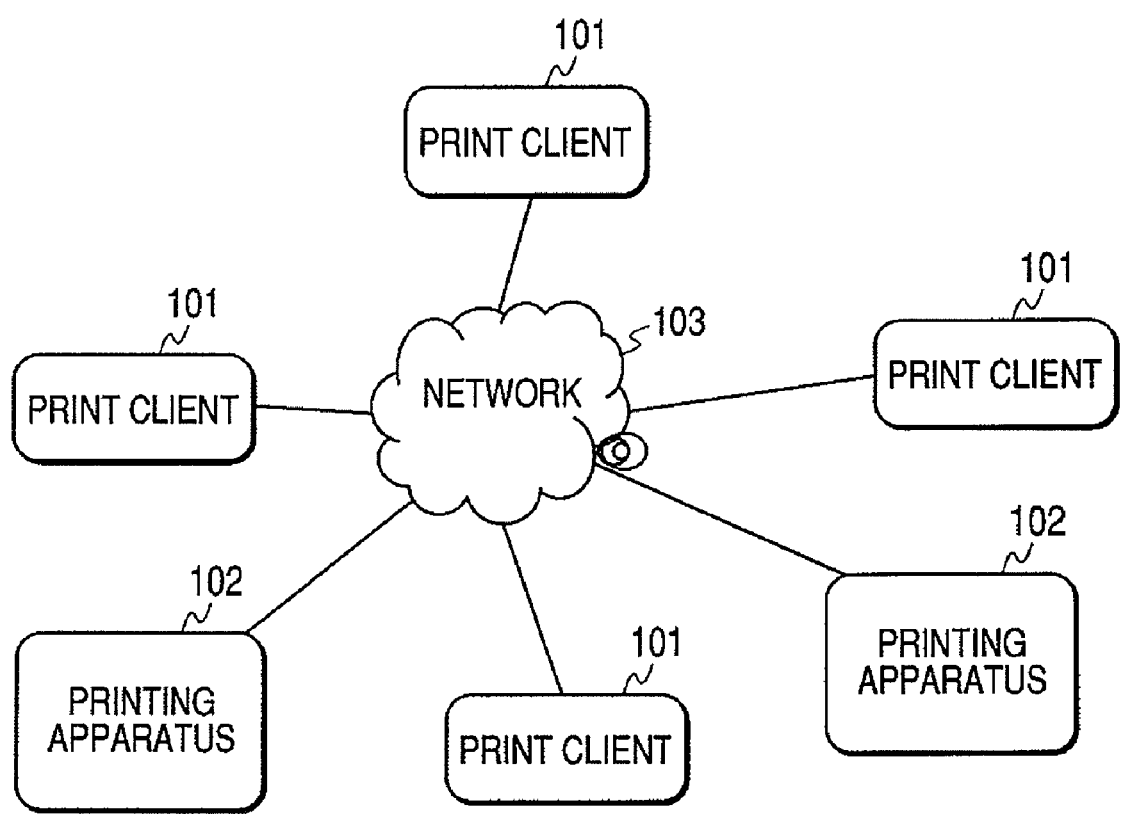
FIG. 1 is a schematic diagram exemplifying a configuration of a print system in a first embodiment of the present invention.

FIG. 1 is a schematic diagram exemplifying a configuration of a print system in a first embodiment of the present invention. A print system in the present embodiment is an example of such a system that prints a document instructed by a print client efficiently regardless of the version of a document being present in a printing device at a destination of print.

In FIG. 1, reference numeral 101 denotes a print client, and is, for example, a personal computer (information processing apparatus) connectable to a network 103. Reference numeral 102 denotes a printing device of implementing printing in accordance with a print request from a print client 101 received through the network 103, and is, for example, a printer, a complex machine and the like. In the present embodiment, the printing device 102 is assumed to be a complex machine having a document storing function. The print client 101 and the printing device 102 are mutually brought into connection through the network 103.

Figure 2:
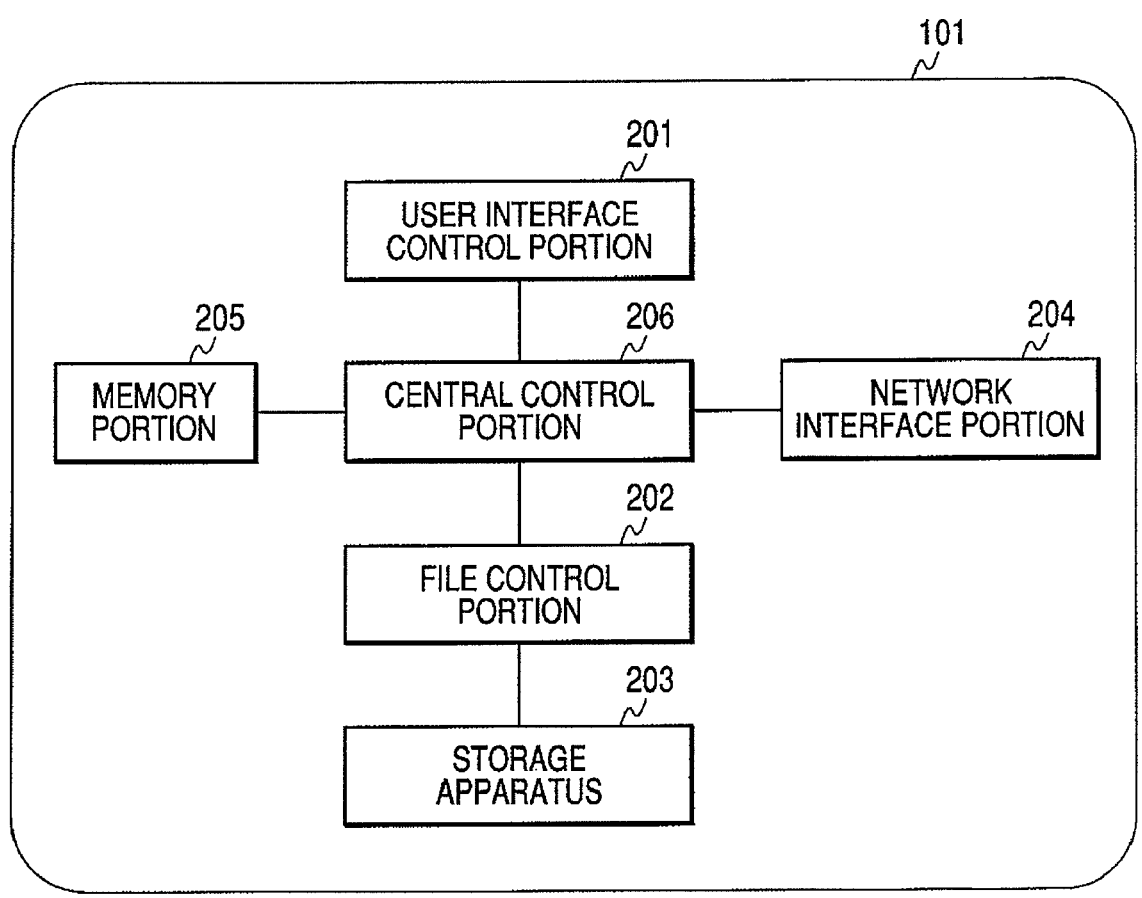
FIG. 2 is a block diagram showing an internal configuration of a print client 101 inside a print system having been shown in FIG. 1.

Next, the internal configuration of a print client 101 inside a print system shown in FIG. 1 will be described. FIG. 2 is a block diagram showing an internal configuration of a print client 101 inside a print system shown in FIG. 1. As shown in FIG. 2, the print client 101 is mainly configured by a user interface control portion 201, a file control portion 202, a storage apparatus 203, a network interface portion 204, a memory portion 205 and a central control portion 206. The user interface control portion 201 controls a UI (user interface) such as an input apparatus and the like for allowing a user to implement operations and confirmation. The file control portion 202 controls files such as document data and the like to write them onto the storage apparatus 203 and read them from the storage apparatus 203 or the like. The network interface portion 204 is connected to the network 103 so as to transmit requests to a device on the network 103, receive responses from a device on the network 103. The memory portion 205 stores temporary data and stores an execution code at the time of executing a program. The central control portion 206 executes an execution code stored in the memory portion 205 to control the user interface portion 201, the file control portion 202, the network interface portion 204 and the like. Here, the memory portion 205 is, for example, RAM and the central control portion 206 is, for example, a CPU (central processing unit).

Figure 3:
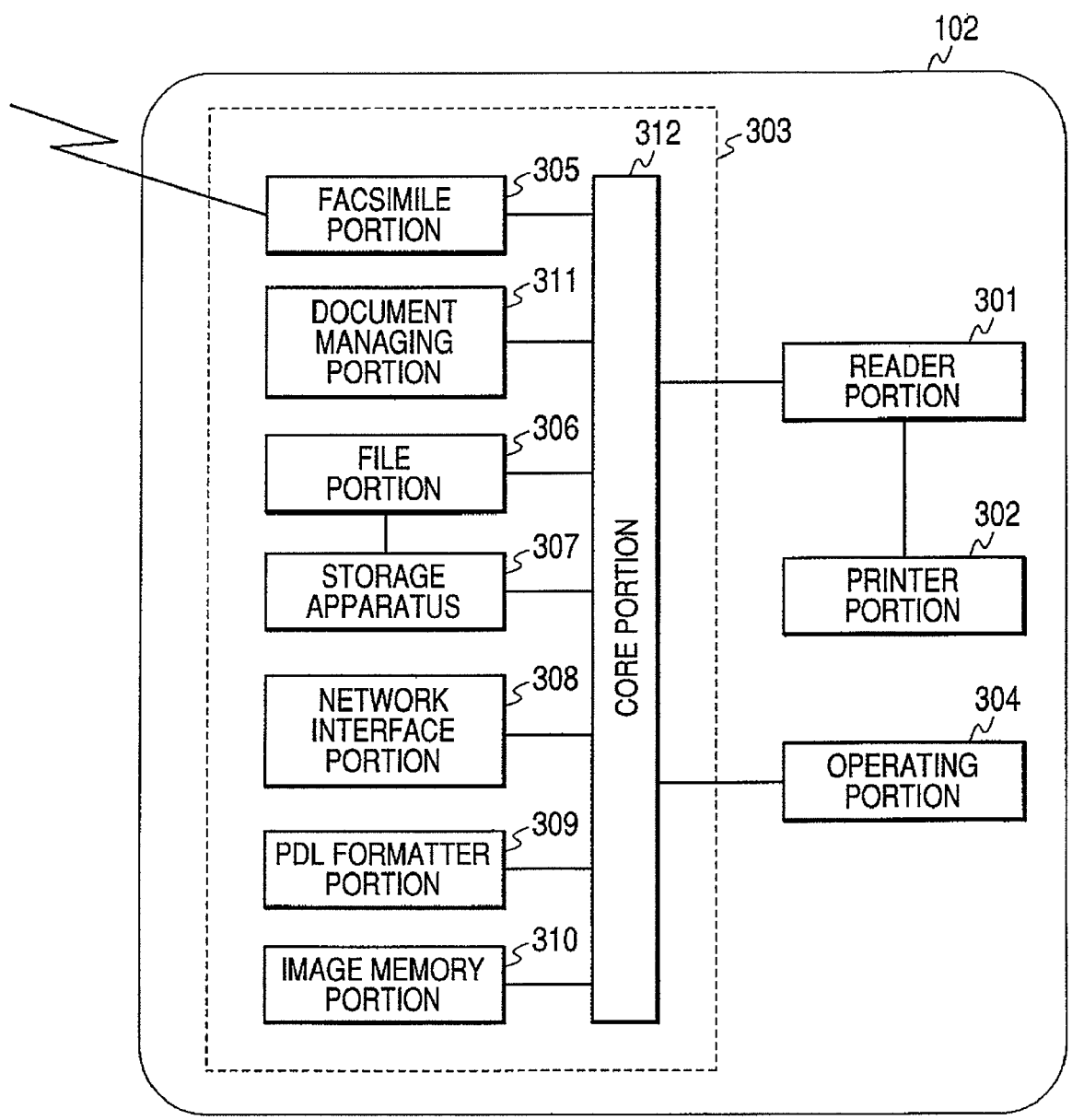
FIG. 3 is a block diagram showing an internal configuration of a printing device 102 inside a print system having been shown in FIG. 1.

Next, the internal configuration of the printing device 102 inside the print system having been shown in FIG. 1 will be described. FIG. 3 is a block diagram showing an internal configuration of a printing device 102 inside a print system having been shown in FIG. 1. The printing device 102 shown in FIG. 3 is an integral type complex machine that functions as a scanner, a printer, a photocopier and a facsimile. As shown in FIG. 3, the printing device 102 is mainly configured by a reader portion 301, a printer portion 302, an image input/output control portion 303 and a user interface portion 304.

The reader portion 301 functions as a scanner so as to be connected to the image input/output control portion 303 to read images of a manuscript as well as to output the read image data to the printer portion 302 or the image input/output control portion 303.

The printer portion 302 prints, onto recording paper, the image data outputted from the reader portion 301 as well as the image input/output control portion 303. The image input/output control portion 303 is brought into connection to an outside network 103 as well as a public line and reads image data from the output storage apparatus to input/output image data. The user interface portion 304 is configured by a plurality of operation buttons that a user operates and a display apparatus displaying a screen for setting various functions mounted to the printing device 102. In addition, the user interface portion 304 accepts user's input in utilization of the operation buttons in the setting screen to notify the image input/output control portion 303 as instruction information.

The image input/output control portion 303 is configured by a facsimile portion 305, a file portion 306, a storage apparatus 307, a network interface portion 308, a PDL (Page Description Language) formatter portion 309, an image memory portion 310, a document managing portion 311 and a core portion 312.

The facsimile portion 305 functions as a facsimile to be connected to the core portion 312 as well as to a public line network, to extend compressed image data received from the public line and transmit the extended data to the core portion 312. In addition, it compresses image data transmitted from the core portion 312 to transmit the compressed image data to the public line network through the public line. The file portion 306 is connected to the core portion 312 and the storage apparatus 307 and writes image data and document data transmitted from the core portion 312 onto the storage apparatus 307. Moreover, the file portion 306 reads the image data and document data from the storage apparatus 307 based on a request from the core portion 312 to transmit them to the core portion 312.

The network interface portion 308 is an interface to be brought into connection to an outside network 103. Reception of job control data from the print client 101 connected to the network 103 and the like and reception of various types of requests from the print client 101 is implemented through this network interface portion 308. The job control data include PDL data together with the job control order. This job control order is a control order and the like on post-processing in the printer portion 302 such as, for example, causing PDL data to undergo conversion and print as image data and thereafter staple sort and discharge. In addition, a database called MIB (Management Information Base) is built in the network interface portion 308 that is exchanged in communication with the print client 101 and the like on the network 103 through SNMP (Simple Network Management Protocol) to enable management of the printer portion 302.

The PDL formatter portion 309 is connected to the core portion 312 to implement processing of expanding, into image data in a data format (for example, a bitmap format) allowing print processing in the printer portion 302, PDL data that the network interface portion 308 has received from the print client 101 connected to the network 103. The image memory portion 310 is recording media for temporarily accumulating image data from the reader portion 301 and image data that the network interface portion 308 has received through the network 103.

The document managing portion 311 manages image data and document data stored in the storage apparatus 307. It takes out information on document data stored in the storage apparatus 307, implements update processing on document data by applying difference data to the document data.

The core portion 312 controls data that flow between the reader portion 301, the user interface portion 304, the facsimile portion 305, the file portion 306, the network interface portion 308, the PDL formatter portion 309, the image memory portion 310 and the document managing portion 311 described above and analyzes job control data.

Figure 4:
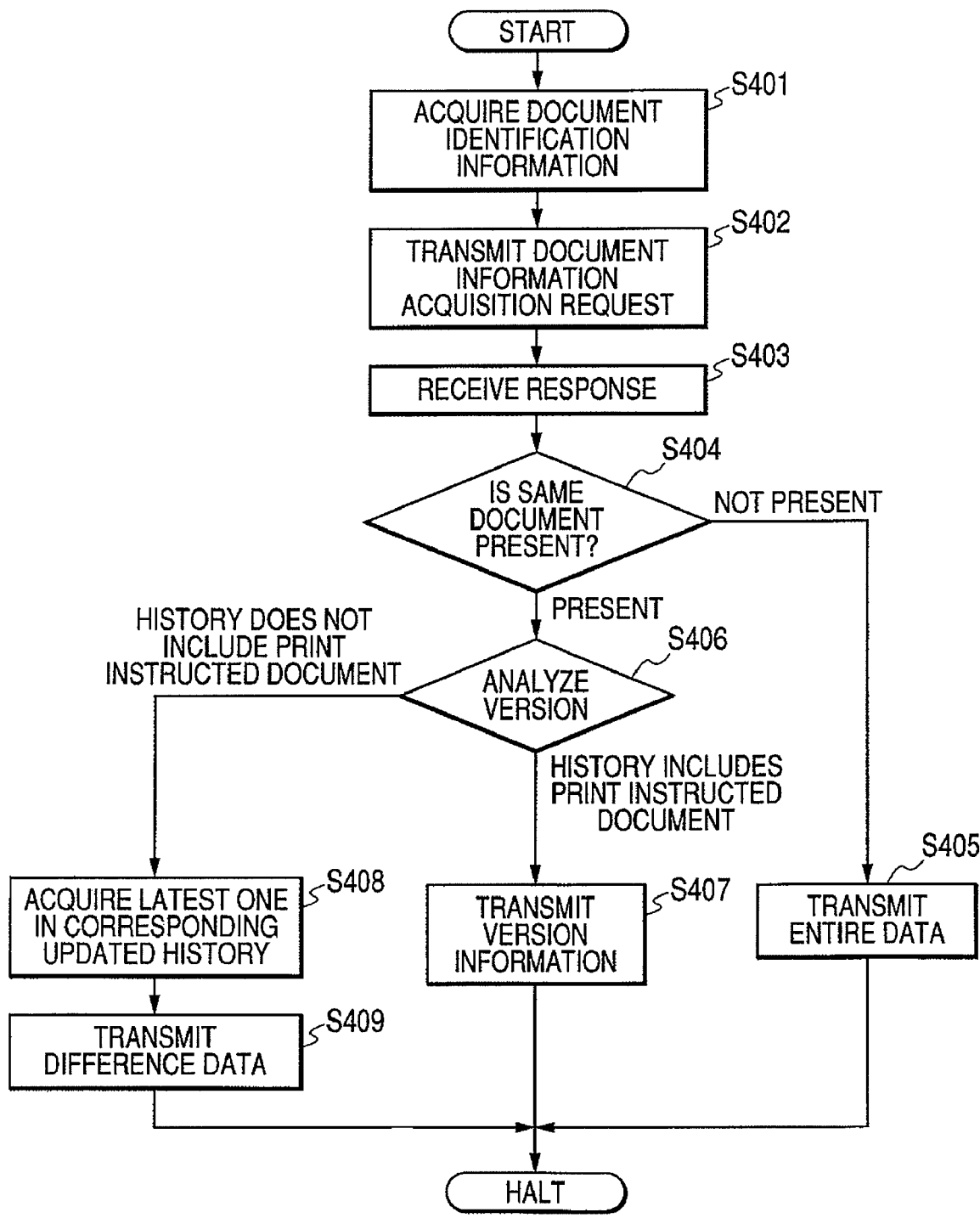
FIG. 4 is a flow chart showing a flow of print request processing in a print client 101 having been shown in FIG. 1.

Next, print request processing in the print client 101 shown in FIG. 1 will be described. FIG. 4 is a flow chart showing a flow of print request processing in a print client 101 shown in FIG. 1. In the case where print instruction of document data from a user is implemented through the user interface control portion 201 of the print client 101, at first in Step S401, the central control portion 206 obtains document identification information from the print-instructed document data. Next, the step goes forward to Step S402 where the central control portion 206 transmits, to the printing device 102 at the destination of the print request, the request for obtaining information on document matching the document identification information obtained in Step S401.

Thereby, the printing device 102 transmits information (hereinafter, referred to as response information), that specifies whether or not document data matching the document identification information are present in storage in the storage apparatus 307, to the print client 101 at the source of request in response to an information obtaining request from the print client 101. Moreover, in the case where the document data matching the document identification information is present in storage, the printing device 102 transmits version information being information such as update history on the above described document data (hereinafter, referred to as fist version information) included in the response information to the print client 101 at the source of request. Here, in the present embodiment, the version information is also called as update information.

Next, in Step S403, the network interface portion 204 receives from the printing device 102 the response information for Step S402 through the network 103. Next, the step goes forward to Step S404 where the central control portion 206 determines, based on the response information received in Step S403, whether or not a document that matches the document identification information obtained in Step S401 is present in the printing device 102 at the destination of the print request. If no identical document has been determined to be present, the step goes forward to Step S405 where the central control portion 206 transmits, to the printing device 102 at the destination of the print request, the print-instructed entire document data (entire data) from a user and the print request processing comes to an end.

On the other hand, in Step S404, in the case where a document matching the document identification information obtained in Step S401 has been determined to be present, the step goes forward to Step S406. In Step S406, the central control portion 206 compares the first version information included in the response information received in Step S403 with version information of print-instructed document (hereinafter, referred to as second version information) to proceed with analysis. As a result of this analysis, in the case where the version of the print-instructed document has been determined to be identical to the version of the document being present in storage in the printing device 102 at the destination of the print request and in the case the version of print-instructed document has been determined to be included (the version of document in storage in the printing device 102 is newer), the step goes forward to Step S407 where the central control portion 206 transmits, to the printing device 102 at the destination of the print request, the version information being information specifying an update history of the print-instructed document and the print processing comes to an end.

On the other hand, as a result of analysis of Step S406, in the case where the version of document in storage in the printing device 102 does not include the version of the print-instructed document (that is, the version having undergone print instruction is newer), the step goes forward to Step S408. In Step S408, the central control portion 206 determines the latest version (update history) matching between the first version information on the documents in the printing device 102 and the second version information on the print-instructed document. Next, the step goes forward to Step S409 where the central control portion 206 transmits, to the printing device 102, update history information (difference data) of the version determined in Step S408 and onward in the second version information and the print request processing comes to an end.

As is shown so far, in the case where the print-instructed document is already present in storage in the printing device, the print client 101 in the present embodiment can request for printing in utilization hereof. Moreover, the print client 101 brings the update history information (first version information) of documents in storage in the printing device 102 and the update history information (second version information) of the print-instructed document into comparison and analysis and thereby can transmit only necessary and least information (version information transmitted in Step S407 or difference data transmitted in Step S409) for document print processing in the printing device 102. Thereby, the print client 101 puts the update history information on documents into practical use so as to be capable of shortening time for transferring print data to the printing device 102.

Figure 5:
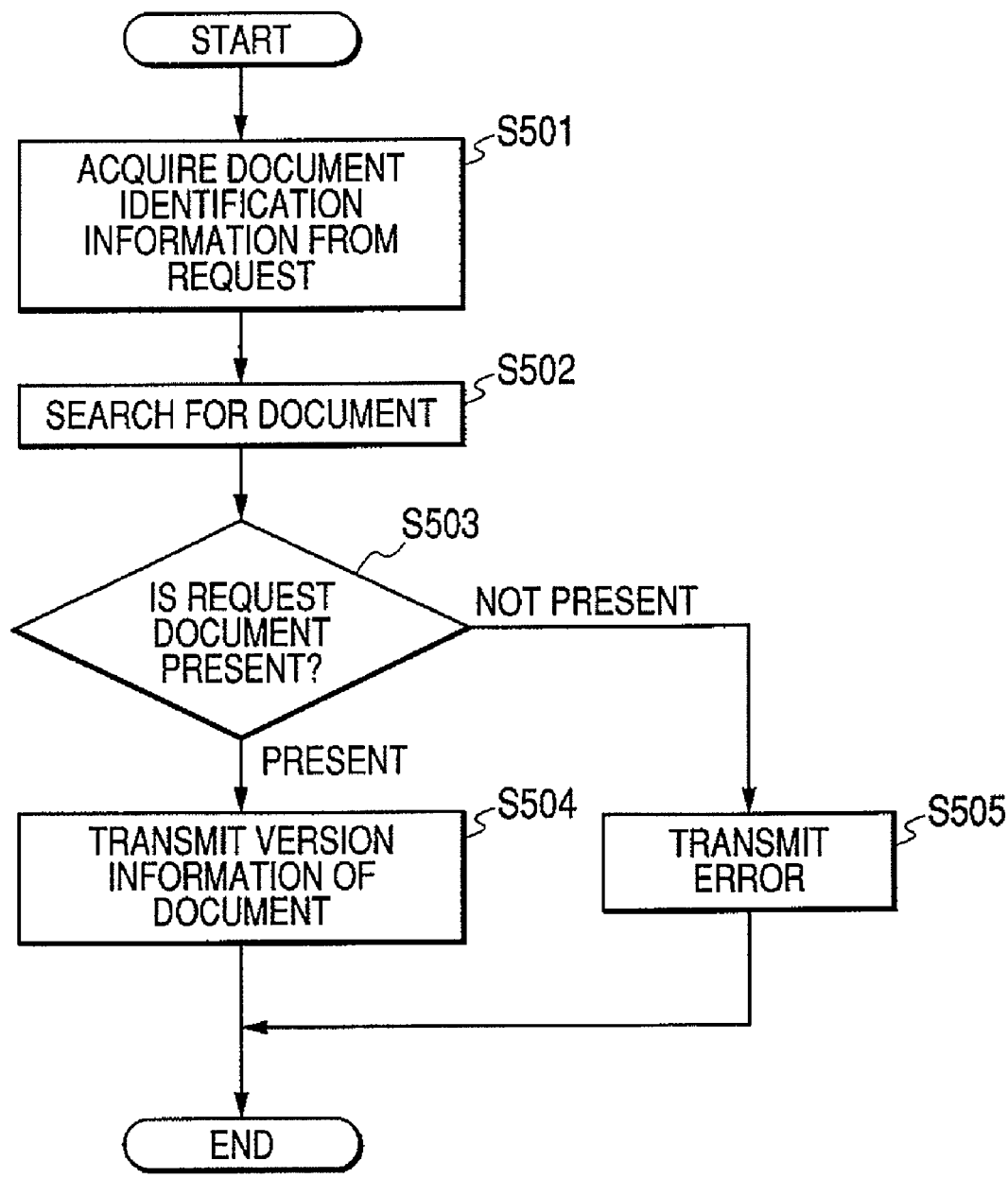
FIG. 5 is a flow chart showing a flow of document information processing of a printing device 102 having been shown in FIG. 1.

Next, document processing of the printing device 102 having been shown in FIG. 1 will be described. FIG. 5 is a flow chart showing a flow of document information processing of a printing device 102 having been shown in FIG. 1. The printing device 102 receives information obtaining request (see Step S402 in FIG. 4) from the print client 101, and then at first, in step S501, takes out document identification information from the information obtaining request. Next, in Step S502, the image input/output control portion 303 looks up for a document matching the document identification information taken out in Step S501 from documents in storage inside the storage apparatus 307.

Next, the step goes forward to Step S503 so that the image input/output control portion 303 determines based on a look-up result of Step S502, whether or not a document matching the document identification information is in storage inside the storage apparatus 307. Here, in the case where the printing device 102 has been determined to retain a document matching the document identification information (that is, to be present in storage inside the storage apparatus 307), the step goes forward to Step S504 so that the image input/output control portion 303 transmits the response information including update identifier information of the relevant document (first version information) to the print client 101 at the source of request and the document information processing comes to an end.

On the other hand, in the case where the printing device 102 has been determined to retain no document matching the document identification information (that is, not to be present in storage inside the storage apparatus 307), the step goes forward to Step S505 so that the image input/output control portion 303 transmits error message to the print client 101 at the source of request and the document information processing comes to an end.

Figure 6:
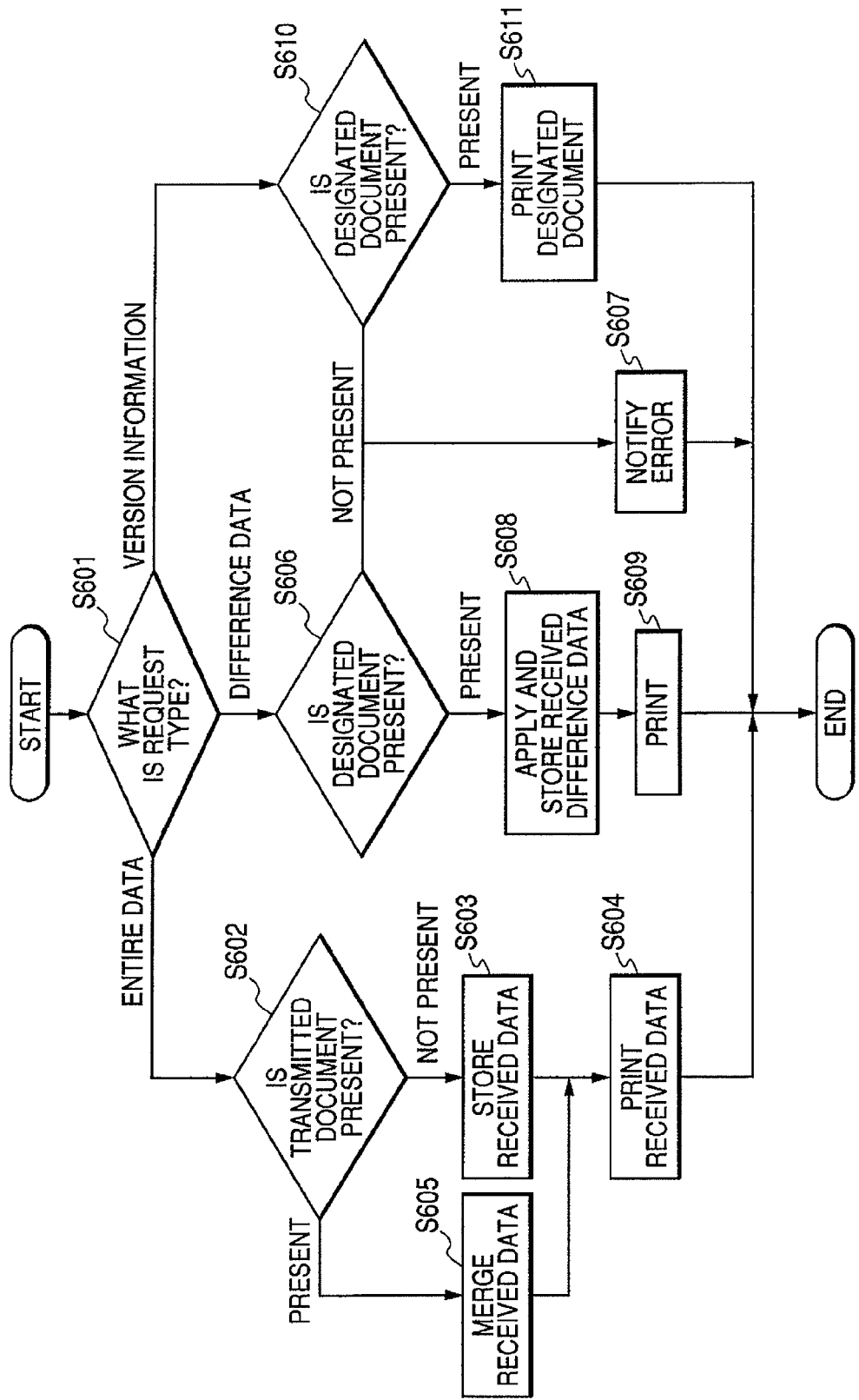
FIG. 6 is a flow chart showing a flow of print processing of a printing device 102 having been shown in FIG. 1.

Next, print processing of the printing device 102 having been shown in FIG. 1 will be described. FIG. 6 is a flow chart showing a flow of print processing of a printing device 102 having been shown in FIG. 1. The image input/output control portion 303 of the printing device 102 receives a print request from the print client 101, and then at first determines the type of received print request in Step S601. In the present embodiment, as shown in FIG. 4, there are three types as print request type, that is, the one including difference data, the one including version information and the one including the entire data.

In the case where the type of the print request is determined, in Step S601, to be the entire data, the image input/output control portion 303 goes forward to Step S602. In Step S602, the image input/output control portion 303 determines whether or not the received entire data is already present inside the printing device 102. In Step S602, in the case where no document that is identical to the received entire data has been determined to be present inside the printing device 102, the step goes forward to Step S603 so that the image input/output control portion 303 stores the received entire data inside the storage apparatus 307. Next, in Step S604, the printer portion 302 receives, from the image input/output control portion 303, the received entire data, and the print processing comes to an end.

On the other hand, in Step S602, in the case where a document that is the same as the received entire data has been determined to be present inside the printing device 102, the step goes forward to Step S605. In Step S605, the image input/output control portion 303 brings the document having been determined to be the same as the entire data and the received entire data into merger (integration) so as to update the relevant document into the latest state. However, in the case where the document already in storage inside the printing device 102 is newer, nothing will be implemented in Step S605. Next, in Step S604, the entire data subject to merger are printed and the print processing comes to an end.

On the other hand, in the case where the type of the print request has been determined, in Step S601, to be difference data, the step goes forward to Step S606. In Step S606, the image input/output control portion 303 determines whether or not a document being an update subject is present inside the printing device 102. Here in the case where no document being the update subject has been determined to be present inside the printing device 102, the image input/output control portion 303 notifies, in Step S607, the print client 101 at the source of request of error message and the print processing comes to and end. On the other hand, in Step S606, in the case where a document being the update subject has been determined to be present inside the printing device 102, the step goes forward to Step S608. In Step S608, the image input/output control portion 303 applies the difference data to the document being the update subject to update the document data into the latest state and stores them inside the storage apparatus 307. Next, in Step S609, the printer portion 302 receives document data subject to an update from the image input/output control portion 303 to implement print processing and the print processing comes to an end.

In addition, in the case where the type of the print request is determined, in Step S601, to be the version information, the step goes forward to Step S610 so that the image input/output control portion 303 determines whether or not the designated document is present inside the printing device 102. In the case where no designated document has been determined, in Step S610, to be present, the step goes forward to Step S607 so that the image input/output control portion 303 notifies the print client 101 at the source of request of error message and the print processing comes to and end. On the other hand, in the case where the designated document has been determined, in Step S610, to be present, the printer portion 302 receives the designated document data from the image input/output control portion 303 to implement print processing with a version designated in the above described version information and the print processing comes to an end.

As described so far, the printing device 102 in the present embodiment can provide, in accordance with requests of the print client 101, update history information (first version information) on the document that it is retaining itself. And, as having been described in FIG. 4, based on the first version information, the print client 101 transmits, to the printing device 102, any of the print request including the difference data, the print request including the version information and the print request including the entire data. The printing device 102 can implement print processing in accordance with the print request including the difference data, the print request including the version information and the print request including the entire data respectively to be received from the print client 101. Consequently, the data amount included in the print request to be transmitted from the print client 101 to the printing device 102 is reduced so as to allow a time required for transfer of print data to be shortened.

FIG. 7 is a drawing showing, in a print client 101, a configuration example of a document data (PDL format) at the time of having prepared a novel document. As shown in FIG. 7, a novel document that has been prepared is configured by document identification information and a document body. The document identification information is information for determining individual documents. In the present embodiment, combination of a hash value calculated from contents of the document and preparation date and time and information of specifying the author is regarded as document identification information. When the document data hereof undergo printing in the printing device 102, an output result as in FIG. 8 is derived. FIG. 8 is a drawing showing an output result based on document data in FIG. 7.

Next, a configuration example of document data in the case where the document data having been shown in FIG. 7 have undergone an update will be described. FIG. 9 is a drawing showing a configuration example of document data in the case where document data having been shown in FIG. 7 have undergone an update. As shown in FIG. 9, the updated document data are subject to addition of update information (difference data) in addition to the document identification information and the document body having been shown in FIG. 7. The update information is configured by update identification information and update data. The update identification information is identification information of a document subject to a document update. In the present embodiment, combination of a hash value calculated from contents of the post-update document and update date and time and the update person is regarded as update identification information. The update data are data of difference that indicates what part of a document being the base (document body) has been changed how. When the document data shown in this FIG. 9, undergo printing in the printing device 102, an output result as in FIG. 10 is derived. FIG. 10 is a drawing showing an output result based on document data in FIG. 9. Comparing FIG. 8 with FIG. 10, "Samplo4" on the fourth line from the top in FIG. 8 has been changed to "Sample4" in FIG. 10 (the spelling "o" has been changed to "e").

Next, processing in FIG. 4 at the time when the document data in FIG. 7 is retained inside the printing device 102 while the document data in FIG. 9 has been instructed for printing in the print client 101 will be described. In this case, for the processing in FIG. 4, processing in Steps S408 to S409 is implemented so that the print client 101 transmits difference data to the printing device 102. That difference data will be configured, for example, as shown in FIG. 11. FIG. 11 is a drawing showing an example of difference data transmitted from a print client 101 to a printing device 102. As shown in FIG. 11, the transmitted difference data are configured to include the update identification information and the update data in FIG. 9 to become the difference between the document data in FIG. 7 and the document data in FIG. 9.

Next, processing in FIG. 4 at the time when the document data in FIG. 9 are retained inside the printing device 102 while the document data in FIG. 9 have been instructed for printing in the print client 101 will be described. In this case, for the processing in FIG. 4, processing in Steps S407 is implemented so that the print client 101 transmits version information to the printing device 102. That version information will be configured, for example, as shown in FIG. 12. FIG. 12 is a drawing showing an example of version information transmitted from a print client 101 to a printing device 102. As shown in FIG. 12, the transmitted version data are configured to include only the update identification information indicating the document version in the document data in FIG. 9.

As having been described above, according to the print system in the present embodiment, in the case where an identical document is present in the printing device 102 at the destination of a print request, it is possible to transmit only difference data or version information to implement printing and therefore reduction in data transfer amount will become feasible. Thereby, it will become possible to cause network traffic to decrease and to implement efficient print processing. In addition, since the document data that underwent in the past are accumulated inside the printing device 102 at the destination of print, in the case where a print request on the same document is issued by another print client 101 inclusively, transmission of only version information to the printing device 102 will do so that rapid print processing will become feasible. Thereby, putting the update information on documents into practical use, it is possible to shorten time for data transfer at the time of printing between a plurality of print clients 101 and the printing device 102.

Second Embodiment

As having been described in the first embodiment, since document data requested for printing from a plurality of print clients 101 are stored in the printing device 102, when a print client 101 has tried to print document data being present in hand (hereinafter to be referred to as document data A), the case where document data that are newer (that is, have been updated further) than the document data A (hereinafter to be referred to as document data B) are present on the side of a printing device 102 (that is, the case where the step goes forward to Step S407 in FIG. 4) is considered. In such a case, in FIG. 4, such an embodiment that issues a print request in the version of the document data A has been shown, but such a case where a user desires printing with newer document data B is considered as well. In the second embodiment, in order that such a case is coped with, such a print system that enables a user to select any of the version of the document data A or the version of the document data B to request for print will be described.

Here, a system configuration of a print system, an internal configuration of a print client and an internal configuration of a printing device in the second embodiment are likewise those of the print system in the first embodiment having been shown in FIG. 1 to FIG. 3 and will, therefore, be omitted from description. In addition, processing of the printing devices 102 having been shown in FIG. 5 and FIG. 6 in the first embodiment, the format of the document data having been shown in FIGS. 7, 9, 11 and 12 and the like are likewise as well. Processing flow and UI different from those of the first embodiment will be mainly described below.

Figure 13:
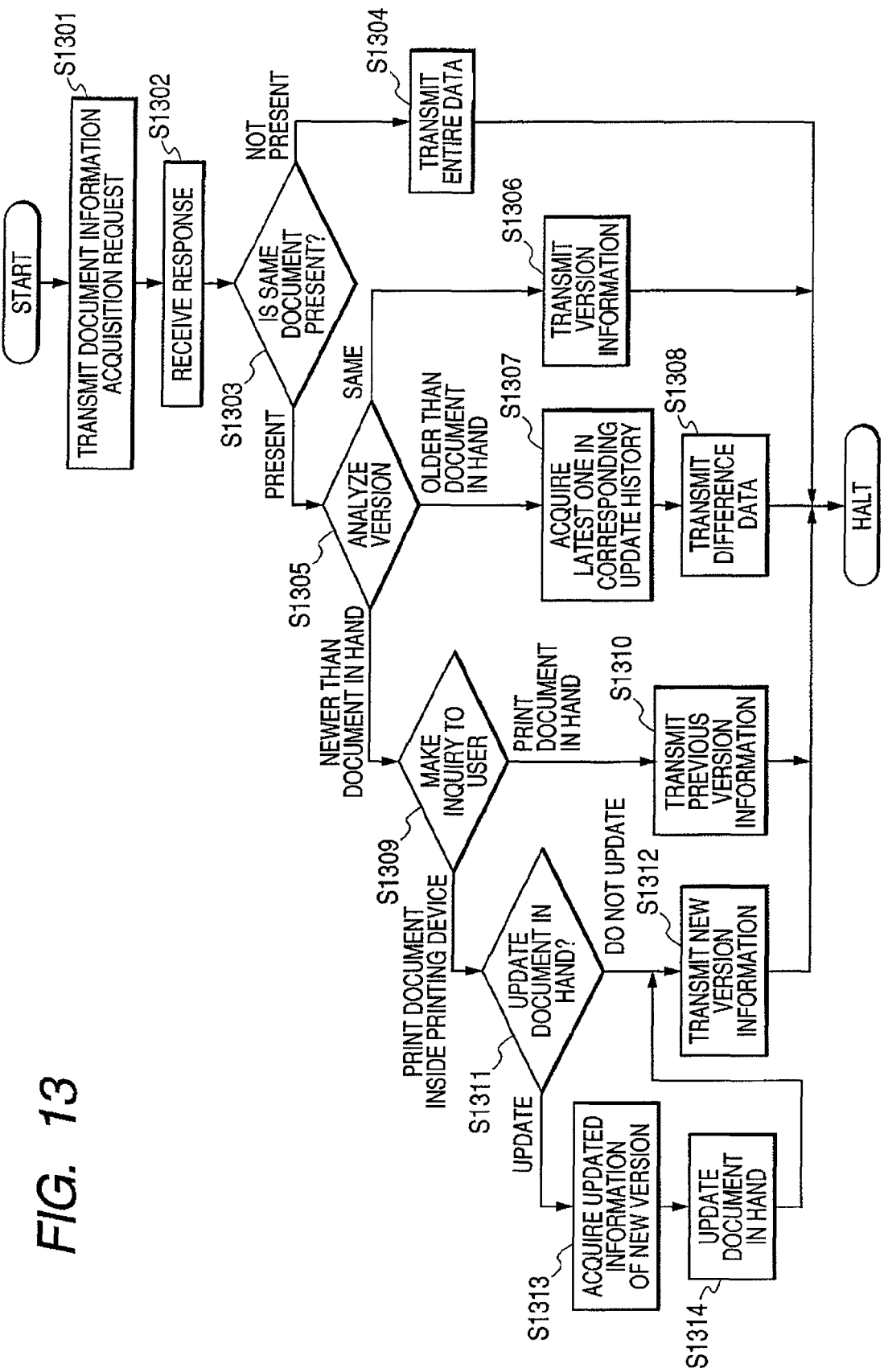
FIG. 13 is a flow chart showing a flow of print request processing in a print client 101 of a second embodiment.

FIG. 13 is a flow chart showing a flow of print request processing in a print client 101 of a second embodiment. In FIG. 13, Step S1301 is processing likewise Step S401 and Step S402 in FIG. 4 and processing in Steps S1302 to S1304 is likewise processing in Steps S403 to S405 in FIG. 4, and therefore will be omitted from description. In addition, processing in Steps S1307 and S1308 in the case where the version of document stored in the printing device 102 in Step S1305 has been determined to be older than the version of a print-instructed document is processing likewise Steps S408 and S409 in FIG. 4, and therefore description thereon will be omitted.

In Step S1305, the central control portion 206 analyzes, from response received in Step S1302, the document history information in storage in the printing device at the destination of print. Here, in the case where the version of the print-instructed document has been determined to be the same as the version of the identical document in storage in the printing device 102, the step goes forward to Step S1306 so that the central control portion 206 transmits, to the printing device 102 at the destination of the print request, version information including update identification information of the print-instructed document data and the print processing comes to an end.

Figure 14:
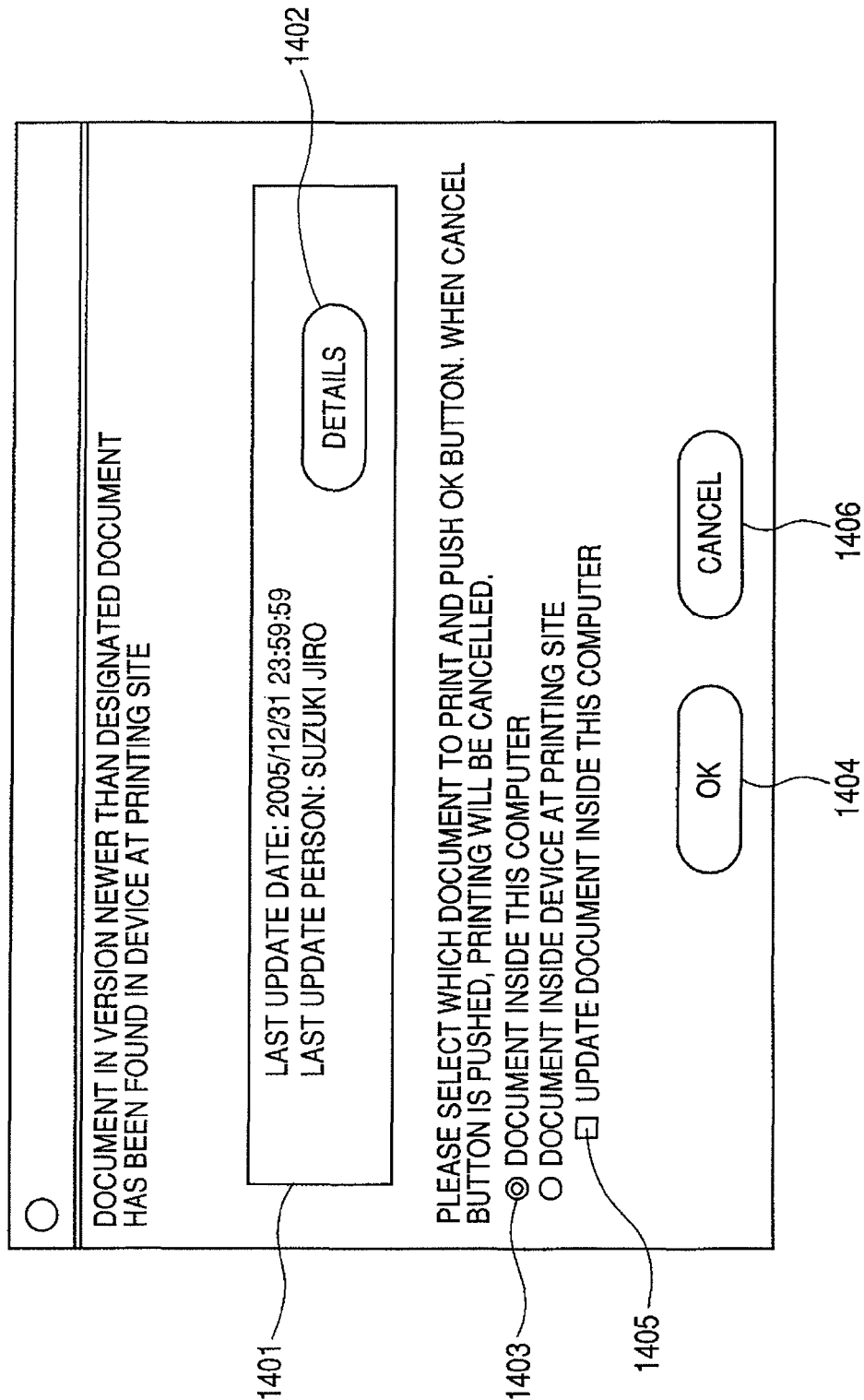
FIG. 14 is a drawing showing, in Step S1309 in FIG. 13, a UI screen example displayed in a display apparatus of a print client 101.

On the other hand, as a result of analysis in Step S1305, in the case where the document in version newer than the version of the print-instructed document has been determined to be present in storage inside the printing device, the step goes forward to Step S1309. In Step S1309, the central control portion 206 displays a UI screen as shown in FIG. 14 onto a display apparatus to encourage a user to select in which version he/she would like to print a document. The UI screen shown in FIG. 14 will be described below.

Figure 15:
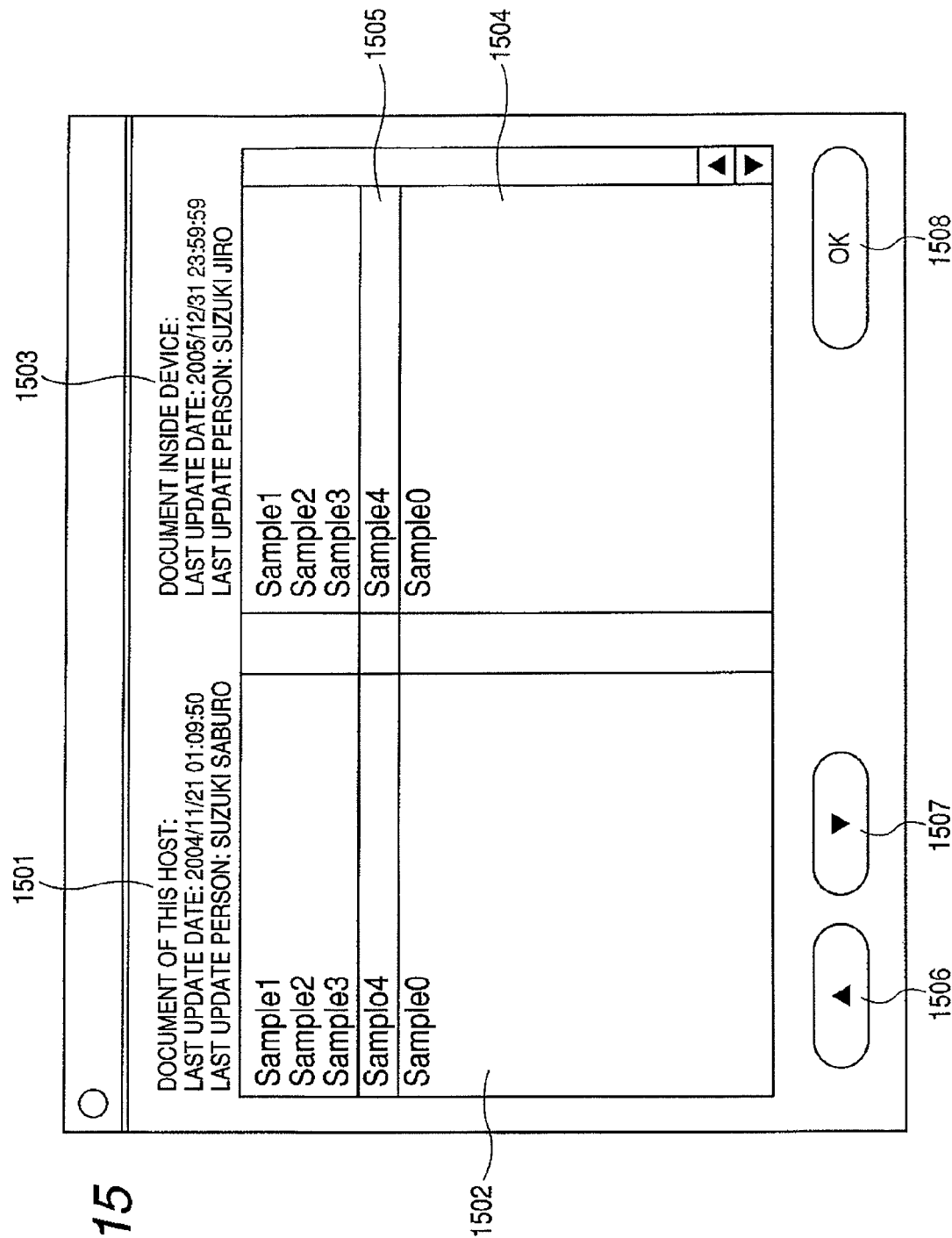
FIG. 15 is a drawing showing an example of a detailed information screen displayed when a detail button 1402 of FIG. 14 is pushed.

FIG. 14 is a drawing showing, in Step S1309 in FIG. 13, a UI screen example displayed in a display apparatus of a print client 101. In FIG. 14, in the rectangular area 1401, information on document data in storage inside the printing device 102 is displayed. In addition, the button 1402 is a button for displaying information on more detailed document data. When a user pushes this button 1402 down, a dialogue in FIG. 15 is displayed. Here, details of FIG. 15 will be described later.

Radio buttons 1403 are buttons for selecting in which version a document is to undergo print. Selecting either one of those radio buttons 1403 and pushing the OK button 1404 down, a document is printed in the selected version. In addition, a check box 1405 is a check box for causing a user to select whether or not to update the version of a document inside the print client 101 in the case where printing is implemented in the version of a document in storage in the printing device at the destination of a print request. When that check box 1405 is checked to execute printing, the document data inside the print client 101 is updated so as to become in the same version in storage in the printing device 102 at the destination of the print request. A cancel button 1406 is a button for canceling printing and when this button is pushed down, printing is cancelled.

Here, description of Step S1309 will be resumed. In Step S1309, in the case where the user has selected to print a document in hand, the step goes forward to Step S1310 so that the central control portion 206 transmits the version information of the document in hand to the printing device 102 at the destination of the print request and the print processing comes to an end.

On the other hand, in the case where the user has selected, in Step S1309, to print new document data in the version in storage inside the printing device 102, the step goes forward to Step S1311. In Step S1311, the central control portion 206 determines whether or not to update the document in hand into the latest state. The present embodiment implements determination by whether or not the user has checked in the check box 1405 in the UI in FIG. 14. In the case where the document in hand has been determined, in Step S1311, to undergo no update, the step goes forward to Step S1312 so that the central control portion 206 transmits the version information of a new document to the printing device 102 at the destination of the print request and the print processing comes an end.

In addition, in Step S1311, in the case where the document in hand has been determined to undergo an update, the step goes forward to Step S1313. In Step S1313, the central control portion 206 issues a request for obtaining update information of the new version to the printing device 102 and obtains the update information. Next, the step goes forward to Step S1314 so that the central control portion 206 applies the obtained update information to the document in hand to update the document in hand. Next, the step goes forward to Step S1312 so that the central control portion 206 transmits the version information of the new document to the printing device 102 and the print processing comes to an end.

FIG. 15 is a drawing showing an example of a detailed information screen displayed at the time of having pushed a detail button 1402 of FIG. 14. In FIG. 15, information on the document (the document in hand) that has been intended to undergo print is displayed in the area 1501. In the area 1502, contents of the document that has been intended to undergo print are displayed. Information on the document in storage in the printing device 102 is displayed in the area 1503. Contents on the document in storage in the printing device 102 are displayed in the area 1504. Moreover, as shown in FIG. 15, a portion of difference between the document that has been intended to undergo print and the document in storage in the printing device 102 is displayed clearly by a frame 1505. In the case where the portion of the difference is present in plurality, the buttons 1506 and 1507 are buttons for jumping to the next difference portion. With these buttons it will become possible to easy confirm the difference portions without difficulty. The OK button 1508 is a button for closing this dialogue.

Next, in Step S1313 in FIG. 13, processing in the printing device 102 in the case where the print client 101 implements a request for obtaining update information of a new version to the printing device 102 at the destination of the print request will be described.

Figure 16:
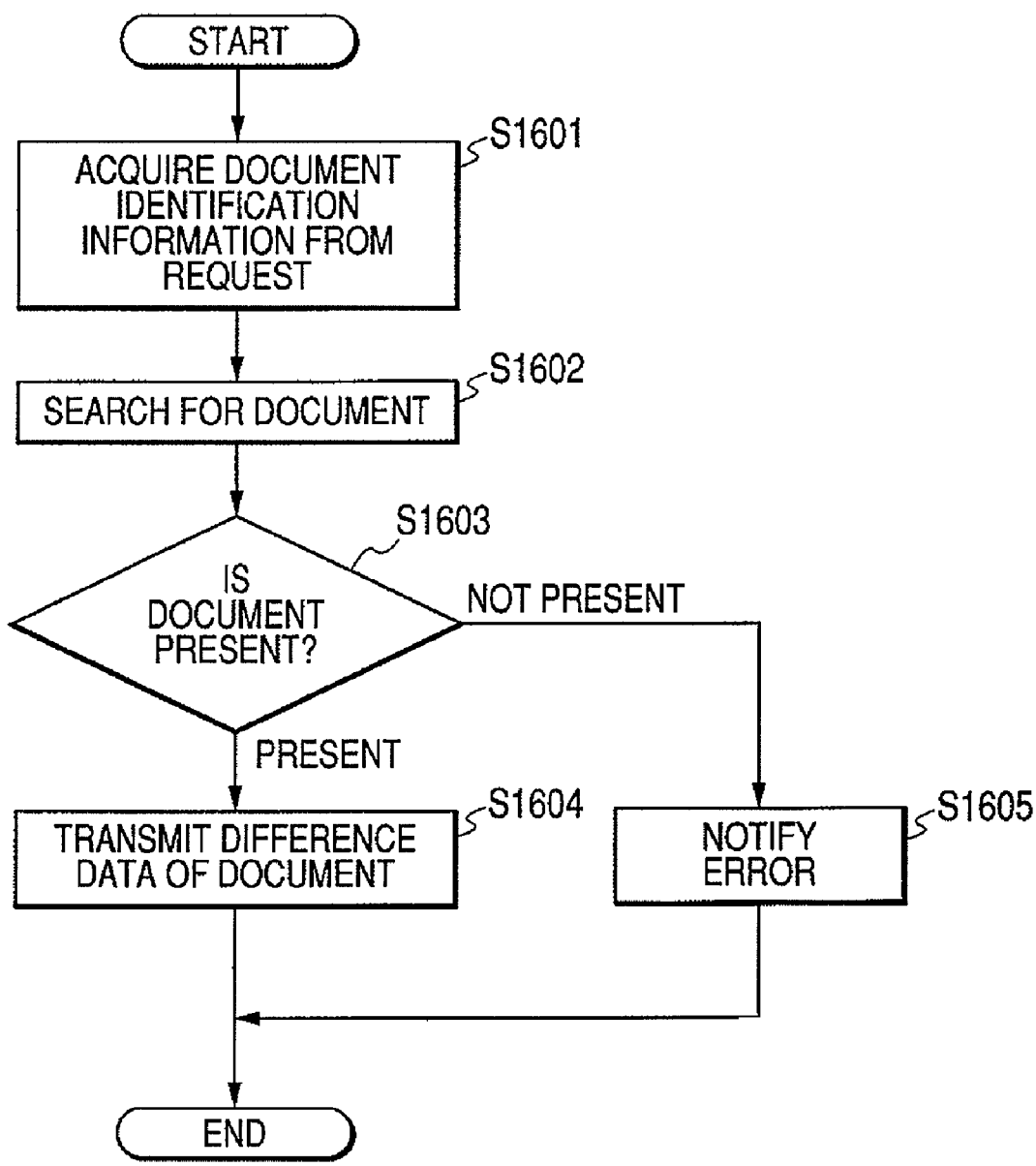
FIG. 16 is a flow chart showing processing in accordance with a request for obtaining a new version of update information in a printing device 102.

FIG. 16 is a flow chart showing processing in accordance with a request for obtaining update information on a new version in a printing device 102. The printing device 102 receives, from the print client 101, a request for obtaining update information on a new version, then at first takes out, in Step S1601, document identification information from the received request and the step goes forward to Step S1602. In Step S1602, the printing device 102 looks up a document matching the document identification information obtained, in Step S1601, from the documents in storage inside the printing device 102 and the step goes forward to Step S1603. In Step S1603, the printing device 102 determines, based on the look-up result in Step S1602, whether or not a document is present inside the printing device 102. If a document is present, the step goes forward to Step S1604 so that the printing device 102 transmits update information of the requested document to the print client 101 at the source of request and the processing comes to an end. On the other hand, in the case where the requested document has been determined, in Step S1603, not to be present inside the printing device 102, the step goes forward to Step S1605 so that the printing device 102 notifies the print client 101 at the source of request of error message and the print processing comes to and end.

As having been described so far, in the case where a document newer than the document being present on the print client 101 is present in the printing device 102 at the destination of print, the second embodiment is caused to have means for causing a user to select which document to print and will thereby become capable of outputting a document in the latest state. In addition, it comprises means for causing selection on whether or not a document in hand is brought into an update and, thereby, will also enable an update of data on a print client 101 into the latest version.

As having been described so far, in the case where an identical document (that may be different in version) is present in the printing device 102 at the destination of print, only difference data or version information will be transmitted to implement print, and therefore reduction in data transfer amounts will become feasible. Thereby, it will become possible to implement printing while decreasing network traffic. In addition, since the printed data are accumulated inside the printing device 102 at the destination of print, at the time when the same document is printed next time, transmission of only version information will do so that rapid print processing will become feasible.

In addition, in the embodiments having been described above, each processing in the print client 101 having been shown in FIGS. 4 and 13 and each processing of the printing device 102 having been shown in FIGS. 5, 6 and 16 is the one that the CPU (central processing unit) reads programs for realizing the function of each processing to execute to realize, thereby, the function thereof.

Here, without being limited to configurations having been described above, each processing in the print client 101 having been shown in FIGS. 4 and 13 and each processing in its entirety or a part of functions thereof of the printing device 102 having been shown in FIGS. 5, 6 and 16 may be realized by dedicated hardware. In addition, the memory of storing the programs having been described above may be configured by a magneto-optical disk apparatus, nonvolatile memory such as flash memory and the like, recording media that allow read only such as CD-ROM and the like, volatile memory other than RAM or recording media in combination of them that allow a computer to read and write.

In addition, a program for realizing functions of each processing in the print client 101 having been shown in FIGS. 4 and 13 and each processing of the printing device 102 having been shown in FIGS. 5, 6 and 16 may be recorded in computer-readable recording media so that a computer system is caused to read and execute the program recorded in these recording media to implement each processing. Here, "computer system" referred to here will include an OS and hardware such as peripherals and the like. In particular, such a case is also included where the program read from storage media is written into memory provided in an extension board inserted into a computer or an extension unit connected to a computer, and thereafter based on instructions of that program, a CPU and the like provided in that extension board or that extension unit implements a part or the whole of actual processing and that processing realizes the functions of the embodiment having been described previously.

In addition, "computer-readable recording media" refers to a storage apparatus selected from the group consisting of a flexible disk, a magneto-optical disk, ROM, portal media such as CD-ROM and the like, a hard disk and the like to be built-in in a computer system. Moreover, "computer-readable recording media" will also include those of retaining a program for a constant time period as in volatile memory (RAM) inside a computer system to become a server or a client in the case where the program has been transmitted through a communication line such as a network such as the Internet and the like and a telephone line and the like.

In addition, the above described program may be transmitted from a computer system in which this program has been stored in a storage apparatus and the like to another computer through transmission media or by transmitted wave in the transmission media. Here, "transmission media" of transmitting a program refers to media that function to transmit information likewise a network (communication network) such as the Internet and the like and a communication line (communication cable) such as a telephone line and the like. In addition, the above described program may be the one for realizing a part of functions having been described previously. Moreover, it may be so-called difference file (difference program) that can realize the functions having been described previously in combination with already recorded programs in a computer system.

In addition, program products such as computer-readable recording media and the like where the above described programs have been recorded are also applicable as an embodiment of the present invention. The above described programs, recording media, transmission media and program products are included in the category of the present invention. So far, the embodiments of this invention have been described in detail with reference to drawings, but the particular configuration will not be limited to these embodiments but designing and the like within the range that will not depart from the gist of this invention will be included as well.

This application claims priority from Japanese Patent Application No. 2005-043100 filed on Feb. 18, 2005, which is hereby incorporated by reference herein.

The invention claimed is:

1. A print system with a plurality of information processing apparatuses capable of dealing with document data retaining identification information of identifying document data, update history information of showing an update state of a part of the document data or in their entirety and update content information included in the update history information and at least one printing device being connected on a network, wherein said information processing apparatus comprises:

an information obtaining unit adapted to obtain from said printing device update history information on a second document data corresponding with a first document data selected as a print subject in said information processing apparatus as a second update history information;

a specifying unit adapted to specify which of the first data and the second data are effective data from the first update history information being update history information of the first document data and the second update history information obtained by said information obtaining unit; and a print requesting unit adapted to implement any of processing to transmit the first update history information to said printing device in accordance with a specified result of said specifying unit or processing to transmit to said printing device update content information in accordance with difference between the first update history information and the second update history information as difference data, and thereby issue to said printing device a print request for the first document data to become the print subject.

2. The print system according to claim 1, wherein said information processing apparatus further comprises a transmission unit adapted to extract and transmit to said printing device identification information of the first document data selected in said information processing apparatus transmit; and said information obtaining unit obtains from said printing device the second update history information, that corresponds with identification information transmitted by said transmission unit, on the second document data in said printing device.

3. The print system according to claim 1, wherein said print requesting unit implements processing of transmitting the first update history information to said printing device in a case where a specified result of said specifying unit is to determine that the first document data and the second document data are of a same update history or to determine that the first document data are newer than the second document data, and implements processing of transmitting the difference data to said printing device in a case where a specified result of said specifying unit is to determine that the second document data are older than the first document data.

4. The print system according to claim 1, wherein said information processing apparatus further comprises a screen displaying unit adapted to display a selection screen including a first selection unit allowing a user to select whether to print the first document data or to print the second document data in a case where a specified result of said specifying unit is to determine that the first document data are older than the second document data; and said print requesting unit implements processing of transmitting the first update history information or the second update history information to said printing device in accordance with user's selection in the selection screen that said screen displaying unit displays.

5. The print system according to claim 4, wherein said screen displaying unit further comprises a reflecting unit adapted:

to display the selection screen further including a second selection unit adapted to encourage a user to select whether or not to cause update content information retained in the first document data to reflect update content information retained in the second document data in a case where the user selects to print the second document data in said first selection unit; and to reflect update content information retained in the second document data onto update content information retained in the first document data in a case where a user selects, in said second selecting unit, to cause update content information retained in the first document data to reflect update content information retained in the second document data.

6. The print system according to claim 1, wherein said printing device comprises a storage unit adapted to store the document data;

a receiving unit adapted to receive identification information of the first document data from said information processing apparatus through the network;

a loop-up unit adapted to look up document data retaining same identification information as identification information of the first document data that said reception unit receives from said storage unit as second document data; and a transmitting unit adapted to transmit update history information retained in the second document data that said loop-up unit looks up to said information processing apparatus as second update history information.

7. The print system according to claim 1, wherein said printing device comprises a printing unit adapted:

to implement print processing on the second document data in an update state in accordance with the first update history information in case of receiving the first update history information as the print request from said information processing apparatus through the network; and to integrate the difference data with the second print data to implement print processing in case of receiving the difference data as the print request from said information processing apparatus through the network.

8. The print system according to claim 7, wherein said printing unit implements print processing on the second document data in case of receiving the second update history information from said information processing apparatus through the network.

9. An information processing apparatus that is connected to at least one printing device through a network and is capable of dealing with document data retaining identification information of identifying document data, update history information of showing an update state of a part of the document data or in their entirety and update content information included in the update history information, comprising:

an information obtaining unit adapted to obtain from said printing device update history information on a second document data corresponding with a first document data selected as a print subject as a second update history information;

a specifying unit adapted to specify which of the first data and the second data are effective data from the first update history information being update history information of the first document data and the second update history information obtained by said information obtaining unit; and a print requesting unit adapted to implement any of processing to transmit the first update history information to said printing device in accordance with a specified result of said specifying unit or processing to transmit to said printing device update content information in accordance with difference between the first update history information and the second update history information as difference data, and thereby issue to said printing device print request for the first document data to become the print subject.

10. A printing device of accepting print requests, through a network, from a plurality of information processing apparatuses capable of dealing with document data retaining identification information of identifying document data, update history information of showing an update state of a part of the document data or in their entirety and update content information included in the update history information, comprising:

a storage unit adapted to store the document data;

a receiving unit adapted to receive identification information of the first document data from said information processing apparatus through the network;

a look-up unit adapted to look up document data retaining same identification information as identification information of the first document data that said reception unit receives from said storage unit as second document data; and a transmitting unit adapted to transmit update history information retained in the second document data that said loop-up unit looks up to the information processing apparatus as second update history information.

11. A print method in use of a print system with a plurality of information processing apparatuses capable of dealing with document data retaining identification information of identifying document data, update history information of showing an update state of a part of the document data or in their entirety and update content information included in the update history information and at least one printing device being connected on a network, comprising:

an information obtaining step of obtaining from the printing device update history information on a second document data corresponding with a first document data selected as a print subject in the information processing apparatus as a second update history information;

a specifying step of specifying which of the first data and the second data are effective data from the first update history information being update history information of the first document data and the second update history information obtained by said information obtaining step; and a print requesting step of implementing any of processing to transmit the first update history information to the printing device in accordance with a specified result of said specifying unit or processing to transmit to said printing device update content information in accordance with difference between the first update history information and the second update history information as difference data, and thereby issue to the printing device a print request for the first document data to become the print subject.

12. A non transitory computer-readable medium storing a program, for a print system with a plurality of information processing apparatuses capable of dealing with document data retaining identification information of identifying document data, update history information of showing an update state of a part of the document data or in their entirety and update content information included in the update history information and at least one printing device being connected on a network, said program comprising:

an information obtaining step of obtaining from the printing device update history information on a second document data corresponding with a first document data selected as a print subject in the information processing apparatus as a second update history information;

a specifying step of specifying which of the first data and the second data are effective data from the first update history information being update history information of the first document data and the second update history information obtained by said information obtaining step; and a print requesting step of implementing any of processing to transmit the first update history information to the printing device in accordance with a specified result of said specifying unit or processing to transmit to said printing device update content information in accordance with difference between the first update history information and the second update history information as difference data, and thereby issue to the printing device a print request for the first document data to become the print subject.

13. An information processing apparatus of transmitting print data to a printing apparatus for printing, comprising:

a transmitting unit adapted to transmit, to the printing apparatus, identification information for specifying print data; and an obtaining unit adapted to obtain update information of print data present in the printing apparatus, the print data corresponding with the relevant identification information;

wherein said transmitting unit transmits difference data between the print data corresponding with the update information that said obtaining unit obtains and print data that are intended to be transmitted.

14. The information processing apparatus according to claim 13, wherein the update information is version information of print data.

15. The information processing apparatus according to claim 13, wherein the difference information is data designated by tag information in structured data.

16. An information processing method in an information processing apparatus of transmitting print data to a printing apparatus for printing, comprising:
- a transmitting step of transmitting, to the printing apparatus, identification information for specifying print data; and
- an obtaining step of obtaining update information of print data present in the printing apparatus, the print data corresponding with the relevant identification information;
- wherein said transmitting step transmits difference data between the print data corresponding with the update information that said obtaining process obtains and print data that are intended to be transmitted.

17. The information processing apparatus according to claim 16, wherein the update information is version information of print data.

18. The information processing apparatus according to claim 16, wherein the difference information is data designated by tag information in structured data.

19. A non transitory computer-readable medium storing a control program for causing a computer to execute an information processing method carried out in an information processing apparatus, wherein the method comprises:
- a transmitting step of transmitting, to the printing apparatus, identification information for specifying print data; and
- an obtaining step of obtaining update information of print data present in the printing apparatus, the print data corresponding with the relevant identification information;
- wherein said transmitting step transmits difference data between the print data corresponding with the update information that said obtaining process obtains and print data that are intended to be transmitted.

* * * * *